Feb. 23, 1926.
M. L. WILSON
COASTER
Filed Jan. 20, 1925
1,574,225
3 Sheets-Sheet 1
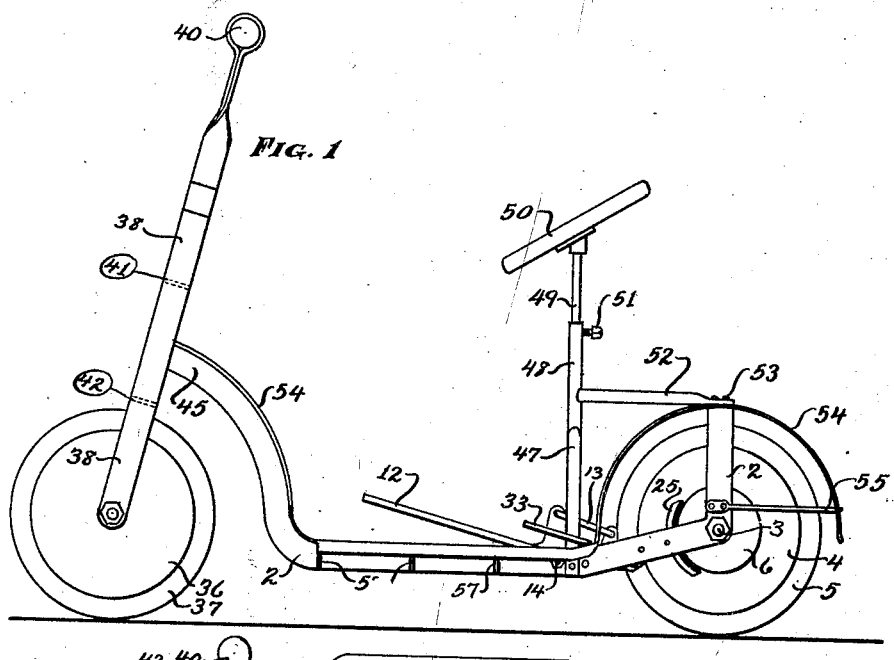
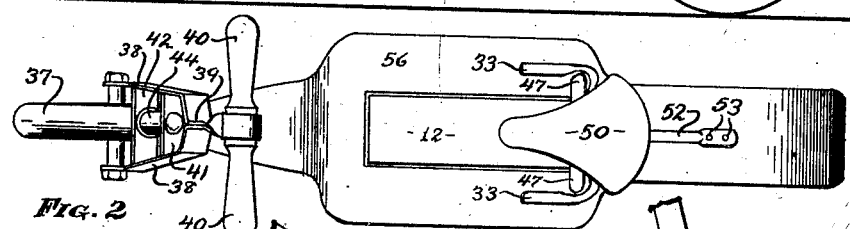
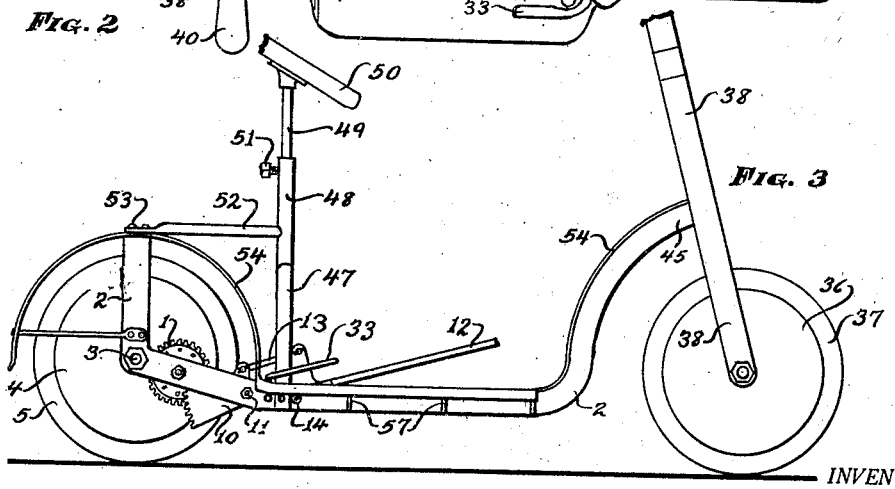
INVENTOR.
Maximus L. Wilson
BY
U. G. Charles
ATTORNEY.

Feb. 23, 1926.
M. L. WILSON
COASTER
Filed Jan. 20, 1925
1,574,225
3 Sheets-Sheet 2
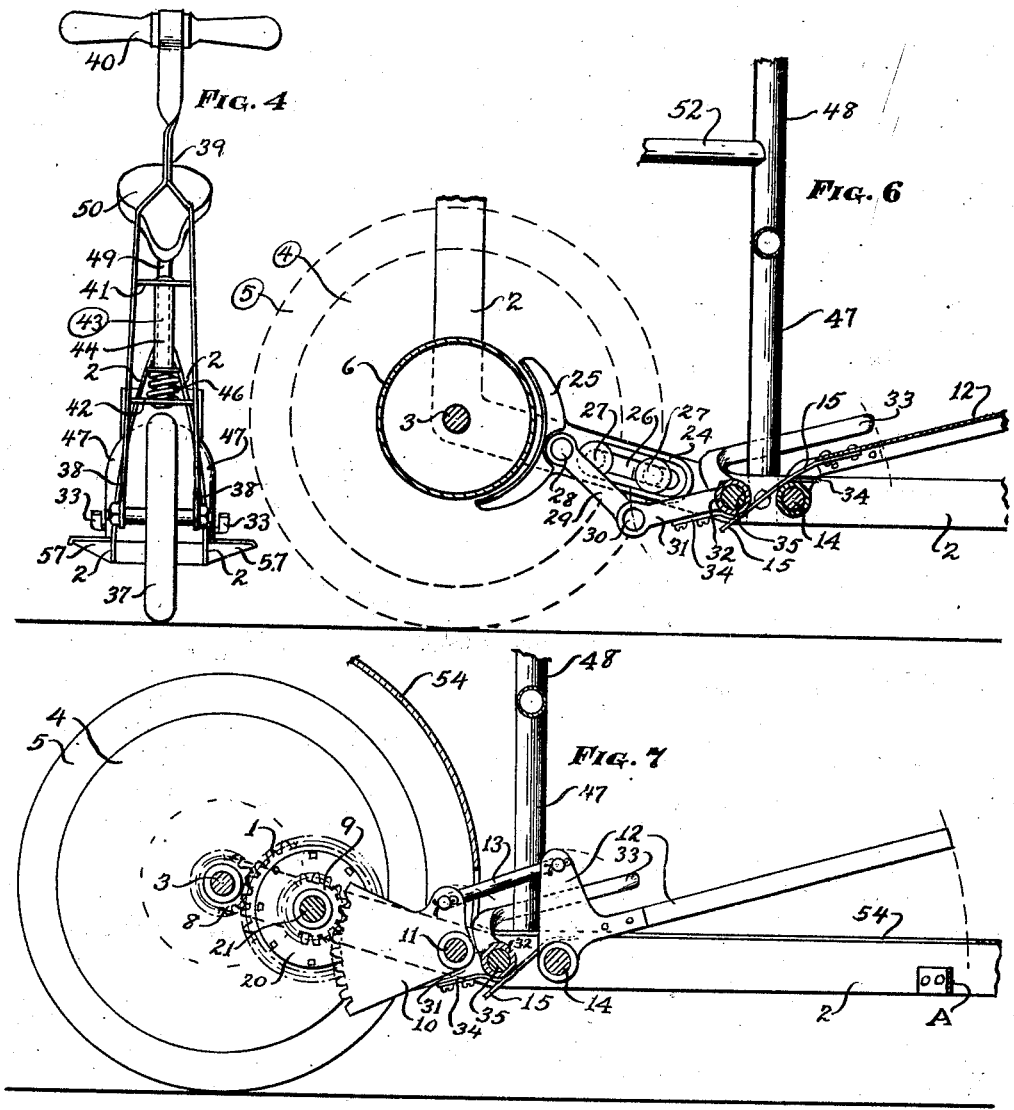
INVENTOR.
Maximus L. Wilson
BY
U. G. Charles.
ATTORNEY.

Feb. 23, 1926.
M. L. WILSON
COASTER
Filed Jan. 20, 1925
1,574,225
3 Sheets-Sheet 3
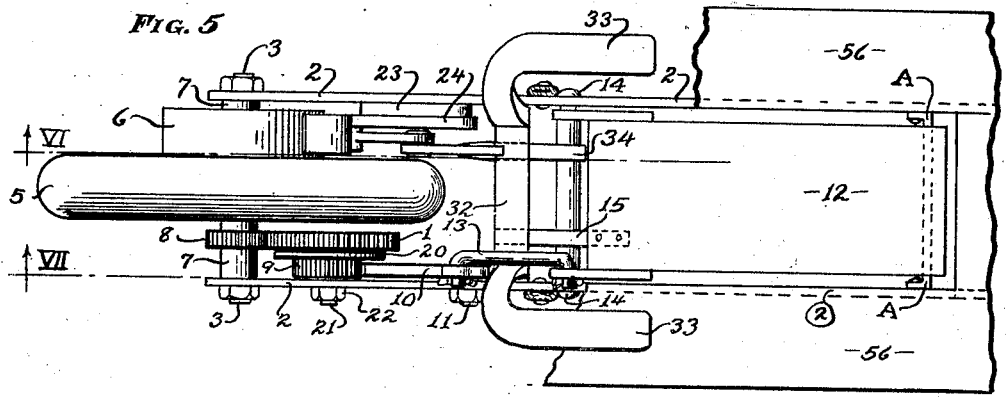
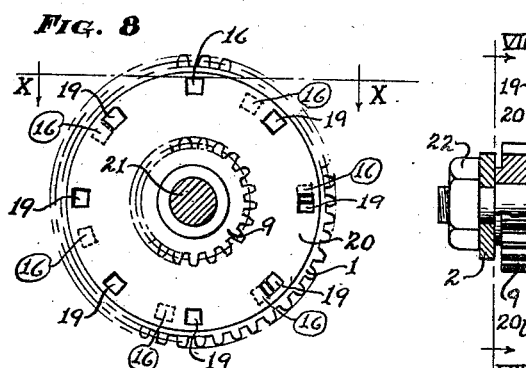
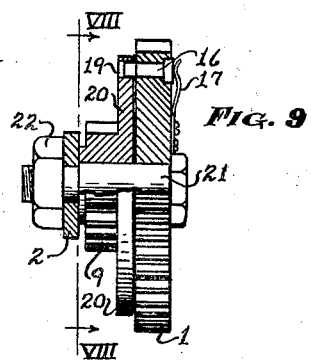
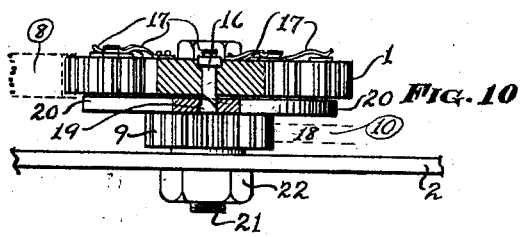
INVENTOR.
Maximus L. Wilson
BY
U. G. Charles
ATTORNEY.

Patented Feb. 23, 1926.

1,574,225

UNITED STATES PATENT OFFICE.

MAXIMUS L. WILSON, OF WICHITA, KANSAS.

COASTER.

Application filed January 20, 1925. Serial No. 3,644.

*To all whom it may concern:*

Be it known that I, MAXIMUS L. WILSON, a citizen of the United States, residing in Wichita, county of Sedgwick, and State of Kansas, have invented new and useful Improvements in Coasters, of which the following is a specification.

My invention relates to wheeled "coasters" of the tandem wheel type, having means whereby the rider can apply motive power to one of the ground-wheels for propelling the coaster and accelerating the speed thereof at will.

The principal objects of the invention are first, to provide a propelling mechanism that operates at high speed, without cranks, toggles, or cranked shafts; second, to provide propelling mechanism comprising a single pedal, one stroke of which operates to impart several revolutions to the driver wheel of coaster.

The invention also includes details of construction to be described.

Referring to the drawings; Fig. 1 is a side view of the coaster. Fig. 2 is a top view of the coaster. Fig. 3 is a side view showing the opposite side from that shown in Fig. 1. Fig. 4 is a front view of the coaster. Fig. 5 is an enlarged detail plan view of the rear portion of the coaster. Fig. 6 is a sectional view taken on the line VI in Fig. 5. Fig. 7 is a view taken on the line VII in Fig. 5. Fig. 8 is an enlarged view of the ratchet drive gear 1, taken along the line VIII in Fig. 9. Fig. 9 is an edge view of Fig. 8, shown partly in section for convenience of illustration. Fig. 10 is an edge view of Fig. 8, showing a section on line X—X in Fig. 8.

2 is the frame, the rear end of which is supported on axle 3, on which is mounted a wheel 4, which may or may not be provided with a rubber tire 5, the said wheel 4 is provided with a brake drum 6 and an axle housing 7 which is rigid to the wheel 4. On the axle housing 7 is mounted a pinion 8 said pinion being driven by the ratchet drive gear 1, said gear being driven by a pinion 9 through a ratchet mechanism, (to be described later). Said pinion 9 is driven by a rockably mounted sector gear 10, said gear being pivoted on the frame 2 as shown at 11 and actuated by a pedal lever 12, which is rigidly connected thereto by rod 13, said pedal lever is pivotally mounted in the frame 2 as shown at 14. The pedal lever 12 is held in a raised position as shown in Figs. 6 and 7, by means of a spring 15. The propelling means for my coaster, is operated as follows: when the operator imposes his weight upon the pedal which is the actuating means for the sector gear, the series of gears between the sector and rear wheel axle are energized, causing a forward rotation of the rear wheel functioning as the propeller for the coaster; the timing of said gears are such, that a number of rotations of said propeller will be had with one downward movement of the pedal, therefore it will be understood that the rapidity of the coaster will be governed by the weight of the operator, and the promptness by which he allows the pedal to rebound to its normal position, imposing their weight thereon. A is a cross member connecting the two sides of the frame 2, and forms a stop for the pedal lever 12 when it has reached its extreme downward thrust.

With this mechanism it is obvious that the rider may propel the coaster at high speed, the speed depending upon the rapidity with which the pedal lever is operated and the weight imposed thereon.

In Figs. 8, 9 and 10 is shown the ratchet mechanism which is made as follows. In the ratchet wheel 1 is mounted a plurality of pawls 16, held in position by springs 17. One end of each pawl 16 is bevelled as shown at 18. The said pawl 16 is adapted to enter into a notch or hole 19, in the plate 20. On said disc, and rigid thereto is the pinion 9, the said pinion and the said plate, and the ratchet wheel 1 are rotatably mounted on a bearing pin 21, mounted in the frame 2, and held firmly in position by the nut 22. This construction permits the ratchet wheel 1 to travel in one direction and drives the wheel 4 in the opposite direction.

Rigidly attached to the wheel 4 is a brake drum 6. On the frame 2 is substantially and rigidly mounted a block 23, which supports a slidably mounted arm 24, one end of which is provided with a brake shoe 25. The said slide arm 24 is provided with a slot 26 and through said slot 26 is placed two pins 27, which are held rigidly in position in the block 23, and these pins 27 at all times hold the brake shoe 25 in its proper position. On the slide arm 24 is a pin 28 on which is mounted a link 29 which carries a pin 30, and on said pin is hinged a link 31, which is integral with a sleeve 32, and integral with the sleeve 32 and at each end thereof is a brake pedal 33, the said links function as a toggle. Said brake pedals are held in their normally raised position as shown in Figs. 6 and 7, by means of a spring 34 which is fastened to the arm 31 by means of screws or any other substantial fastening and cantilevered over the shaft 14 supporting the pedal lever 12. The sleeve 32 being mounted on a shaft 35, which is substantially mounted in the frame 2.

When either of the brake pedals 33 are pushed down, the said toggle joints function as actuating means for said brake.

36 is a wheel which may or may not be provided with a tire 37, said wheel being mounted in a forked frame 38, the top of which is joined together, as at 39 and provided with a handle 40, the said fork 38 is joined together by two members 41 and 42. These members 41 and 42 are joined together with a pin 43 on which is mounted a sleeve 44, to which the end of the curved portion 45 of the frame 2 is rigidly connected. Between the sleeve 44 and the member 42, and around the pin 43 is placed a spring 46, said spring functioning as a shock absorber. This construction adapts the front wheel to be guided at will by the rider. Toward the rear of the frame 2 and mounted thereon is an arched member 47, supporting a hollow standard 48, adapted to receive a shaft 49 which supports a seat 50, said shaft being held in position by set screw 51. The said arched member 47 and standard 48 is held rigidly in position by a brace member 52 which connects to the frame member 2 at the point 53.

Under the frame 52 is placed a substantial covering 54 and extending from the sleeve 44 over the curved portion of the frame 45, and rearwardly to a point just behind the arched member 47, then curves upwardly to the point 53 and then on over the rear wheel to form a fender, the rear end of which is supported by a brace member 55 being rigidly attached to the frame 2. This covering 54 forms the floor 56 of the coaster and is supported by brace members 57.

Such modifications may be made as lies within the scope of the appended claims, and having thus described my invention what I claim as new and desire to secure by Letters Patent is:

1. In bicycle propelling mechanism, a cross-shaft, a supporting frame, a gear wheel rotatable on said shaft, a disc in approximate contact with said shaft and loose thereon, a pinion coaxial with and secured to the disc, and a circular series of drive pawls mounted in apertures in the gear wheel; said disc being provided with a series of openings being one less in number to that of the pawls in said gear so that the pawls will engage one at a time with said openings.

2. In combination with the mechanism set forth in claim 4, a main axle, a ground wheel on said axle, and a pinion of smaller diameter than said gear wheel, meshed with said gear wheel.

3. In bicycle drive gear, a gear wheel having a circular series of slots through its web, a series of pawls mounted in said respective slots and each slidable therein in lines normal to the plane of the wheel, springs for the pawls, and an associated wheel provided with a circular series of pawl-receiving openings.

4. In combination with claim 3, a shaft transversely positioned and rigidly attached to the frame members 2, a sleeve rotatably mounted on said shaft, pedals rigid on both ends of said sleeve, said pedals being means for actuating a brake.

MAXIMUS L. WILSON.